(12) United States Patent
Palermo et al.

(10) Patent No.: US 12,636,959 B2
(45) Date of Patent: May 26, 2026

(54) ELECTRIC AXLE ASSEMBLY FOR A VEHICLE WITH A NOISE CANCELING DEVICE

(71) Applicant: FERRARI S.P.A., Modena (IT)

(72) Inventors: Antonio Palermo, Modena (IT); Matteo Deleo, Modena (IT); Roberto Betro', Modena (IT)

(73) Assignee: FERRARI S.P.A. (IT)

( * ) Notice: Subject to any disclaimer, the term of this patent is extended or adjusted under 35 U.S.C. 154(b) by 107 days.

(21) Appl. No.: 18/596,834

(22) Filed: Mar. 6, 2024

(65) Prior Publication Data

US 2024/0300338 A1 Sep. 12, 2024

(30) Foreign Application Priority Data

Mar. 7, 2023 (IT) ........................ 102023000004131

(51) Int. Cl.
B60L 15/20 (2006.01)
(52) U.S. Cl.
CPC ......... B60L 15/20 (2013.01); *B60L 2240/421* (2013.01); *B60L 2260/42* (2013.01);
(Continued)
(58) Field of Classification Search
CPC .......... B60L 2240/421; B60L 2260/42; B60L 2260/44; B60L 2270/142; B60L 2270/145; B60L 15/20
See application file for complete search history.

(56) References Cited

U.S. PATENT DOCUMENTS 5,904,068 A * 5/1999 Genise .................. F16H 61/702
477/111
6,102,144 A 8/2000 Lutz
(Continued)

FOREIGN PATENT DOCUMENTS

DE 102014206048 A1 10/2014
DE 102015211493 A1 12/2016
DE 102021200755 A1 7/2022

OTHER PUBLICATIONS

Search Report issued in Italian Patent Application No. 102023000004131.
(Continued)

*Primary Examiner* — Gertrude Arthur Jeanglaude
(74) *Attorney, Agent, or Firm* — The Belles Group, P.C.

(57) ABSTRACT
An electric axle assembly for a motor vehicle includes an electric machine suitable for operating as a motor, an axle for transmitting a power delivered by the electric machine to wheels of the motor vehicle, a transducer configured to detect an error variable representative of one or more parameters identifying a first vibration caused by an operation as a motor of the electric machine controlled by a control input, and a control unit configured to acquire the error variable detected by the transducer, determine one or more variable parameters of an adaptive model to compute a correction input to be superposed to the control input to update the control input, determine the correction input using the adaptive model defined with the determined variable parameters, and control the electric machine with the updated control input by superposing the correction input to the control input.

9 Claims, 7 Drawing Sheets

(52) U.S. Cl.
CPC ..... *B60L 2260/44* (2013.01); *B60L 2270/142*
(2013.01); *B60L 2270/145* (2013.01)

(56) References Cited

U.S. PATENT DOCUMENTS

| | | | | |
|---|---|---|---|---|
| 6,314,342 B1 * | 11/2001 | Kramer | ................. | B60W 10/22 |
| | | | | 701/1 |
| 6,806,667 B1 * | 10/2004 | Sasaki | .................... | B60K 6/547 |
| | | | | 318/434 |
| 7,949,452 B2 * | 5/2011 | Eriksson | ............. | B60W 30/188 |
| | | | | 701/55 |
| 8,046,147 B2 * | 10/2011 | Waldbauer | ............. | B62D 6/003 |
| | | | | 701/72 |
| 10,588,258 B2 * | 3/2020 | Jung | ........................ | G05B 6/02 |
| 2012/0081051 A1 * | 4/2012 | Kobayashi | ............ | B60W 10/08 |
| | | | | 903/930 |
| 2012/0083958 A1 * | 4/2012 | Ballard | ................. | B60W 50/10 |
| | | | | 701/56 |
| 2014/0046558 A1 | 2/2014 | Kim | | |
| 2022/0294368 A1 | 9/2022 | Phillips et al. | | |

OTHER PUBLICATIONS

Extended Search Report issued in European Patent Application No.
24161387.6.

* cited by examiner

ELECTRIC AXLE ASSEMBLY FOR A VEHICLE WITH A NOISE CANCELING DEVICE

CROSS-REFERENCE TO RELATED APPLICATIONS

This patent application claims priority from Italian Patent Application No. 102023000004131, filed Mar. 7, 2023, the entire disclosure of which is incorporated herein by reference.

TECHNICAL FIELD

The invention relates to an electric axle assembly for a motor vehicle.

PRIOR ART

An electric axle assembly for a motor vehicle includes an electric machine, which for example can be powered by a battery for operating as a motor, and an axle for transmitting a power delivered by the electric machine to the wheels of the motor vehicle.

Although electric machines are generally considered noiseless, their operation anyway entails the emission of mechanical vibrations which are transferred to the axle and to the elements adapted to support the axle assembly with respect to the body of the motor vehicle.

A portion of the mechanical vibrations has frequencies belonging to the audible spectrum, thus corresponding to a sound perceivable as a noise.

In particular, due to the characteristics of the axle, the vibrations result to be amplified at some specific points of the assembly or more in general of the motor vehicle, thus the intensity of the noise produced is equally amplified at these points.

Therefore, the need is felt to decrease or even cancel the noises produced by the electric axle assembly.

An object of the invention is to satisfy the need described above, preferably in a simple and repeatable manner.

SUMMARY OF THE INVENTION

In one aspect, the invention may be an electric axle assembly for a motor vehicle, the axle assembly comprising: an electric machine suitable for operating as a motor, an axle for transmitting a power delivered by the electric machine to wheels of the motor vehicle, a transducer configured to detect an error variable representative of one or more parameters identifying a first vibration caused by an operation as a motor of the electric machine controlled by a control input, and a control unit configured to: acquire the error variable detected by the transducer, determine one or more variable parameters of an adaptive model configured to compute a correction input to be superposed to the control input to update the control input, thereby correcting the operation of the electric machine as a motor, the parameters of the adaptive model being determined by an optimization algorithm as minimizers of a cost function dependent on the error variable and related to the first vibration, such that a minimum of the cost function corresponds to a minimization of the first vibration, determine the correction input using the adaptive model defined with the determined variable parameters, and control the electric machine with the updated control input by superposing the correction input to the control input.

In a further aspect, the invention may be a noise reduction method for reducing a noise caused by an operation as a motor of an electric machine of an axle assembly with an axle to transmit a power delivered by the electric machine to wheels of a motor vehicle, the method comprising: acquiring from a transducer an error variable representative of one or more parameters identifying a first vibration caused by the operation as a motor of the electric machine controlled by a control input, determining one or more variable parameters of an adaptive model configured to compute a correction input to be superposed to the control input to update the control input, thereby correcting the operation as a motor of the electric machine, determining the correction input by the adaptive model defined with the determined variable parameters, controlling the electric machine with the updated control input by superposing the correction input to the control input, wherein the parameters of the adaptive model are determined via an optimization algorithm as minimizers of a cost function dependent on the error variable and related to the first vibration, such that a minimum of the cost function corresponds to a minimization of the first vibration.

BRIEF DESCRIPTION OF THE DRAWINGS

In the following, an embodiment of the invention is described for a better understanding thereof by way of non-limiting example and with reference to the accompanying drawings wherein.

EMBODIMENTS OF THE INVENTION

Figure 1:
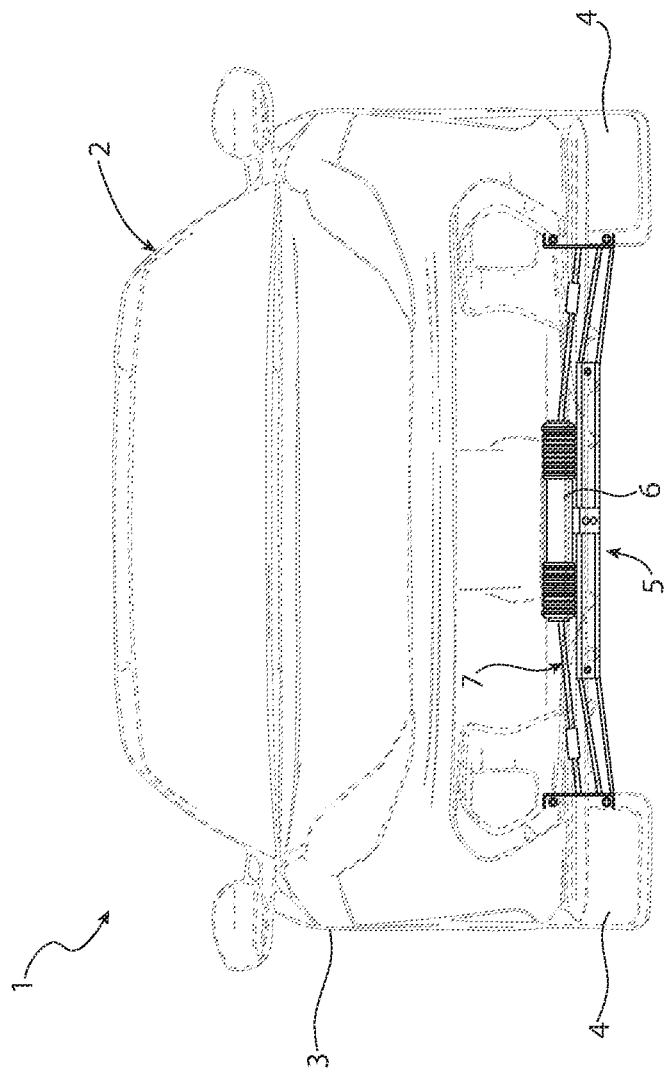
FIG. 1 is a perspective view of a motor vehicle comprising an axle assembly according to the invention.
Figure 2:
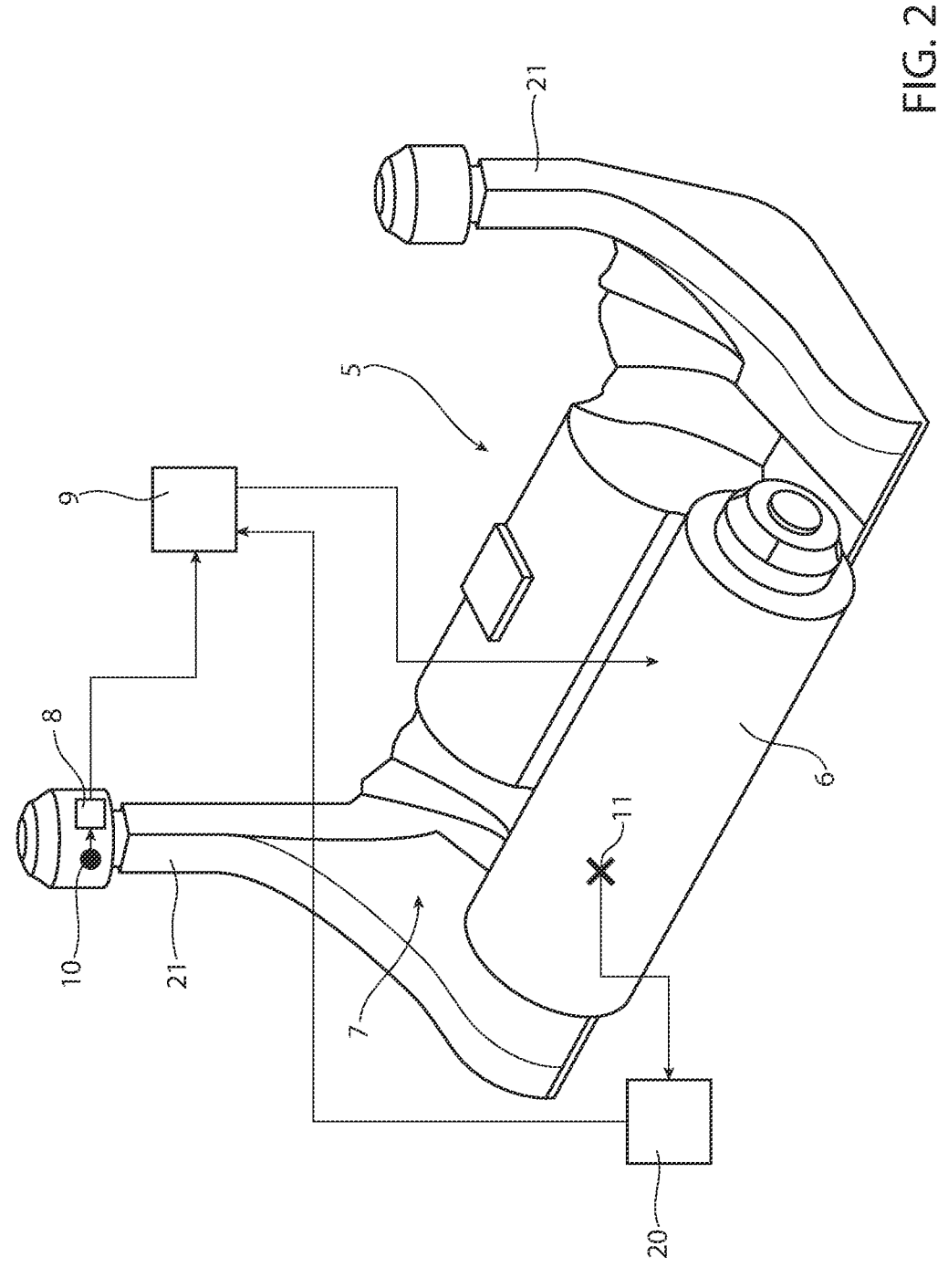
FIG. 2 is a schematic view of a portion of the axle assembly with the indication of a vibration source and of a specific vibration detection point.

In FIG. 1, reference numeral 1 is used to indicate, as a whole, a motor vehicle.

The motor vehicle 1 comprises a body 2, in turn including a chassis not illustrated and a bodywork 3 carried by the chassis and defining the external surfaces of the motor vehicle 1.

Furthermore, the motor vehicle 1 comprises a plurality of wheels 4, (only two of which are illustrated in FIG. 1). The wheels 4 are coupled to the body 2 or more precisely to the chassis by means of suspensions of known type and not illustrated.

The motor vehicle 1 also comprises an axle assembly 5 comprising in turn an electric machine 6 suitable for operating as a motor, an axle 7 for transmitting a power delivered by the electric machine 6 to at least two of the wheels 4, and a noise canceling device for reducing a noise produced by the operation as a motor of the electric machine 6.

Furthermore, the axle assembly 5 comprises one or more legs or supporting elements 21, which are configured to couple the electric machine 6 and/or the axle 7 to the body 2 and to support the electric machine 6 and/or the axle 7 with respect to the body 2 when coupled to the latter. In other words, the legs 21 support the electric machine 6 and/or the axle 7 with respect to the body 2.

Since the electric machine 6 can operate as a motor, the following description will more precisely refer to the electric machine 6 with the term motor 6, for simplicity, but without any loss of generality.

The motor 6 is controllable by a control input, i.e. a control signal, as is usual in the art. The control input can be a control current or a control voltage. Specifically, the control input is the control current.

Furthermore, the motor 6 can be controlled in an open-loop or in a closed-loop control; in both cases, the control input can be a target control signal, for example a target current or a target voltage, in particular corresponding to a request of a driver of the motor vehicle 1 or obtained automatically in the case of autonomous drive of the motor vehicle 1.

Therefore, the operation of the motor 6 is controlled by the control input.

The noise canceling device comprises a transducer 8 and a control unit 9, more specifically coupled to the transducer 8.

The transducer 8 is configured to detect a variable representative of one or more parameters identifying a vibration caused by the operation of the motor 6, in particular at a point 10 of the motor vehicle 1.

The point 10 can be part of the body 2, for example of supports supporting the axle 7 with respect to the body 2 and, consequently, the motor 6 coupled to the axle 7. More precisely, the point 10 is part of one of the legs 21.

Otherwise, the point 10 can be part of the axle 7 or even of the motor 6.

In particular, the point 10 is considered sensible or critical from the point of view of the noise associated with the vibration to be detected.

The parameters identifying the vibration can be, for example, the amplitude, the frequency and the phase of the vibration approximating the vibration to a sinusoidal waveform.

Specifically, the parameters identifying the vibration can be acceleration components, for example referred to three axes of an absolute Cartesian reference system, of the point 10 where the vibration occurs.

Here, the transducer 8 comprises in particular one or more accelerometers coupled to the point where the vibration occurs, or an inertial measurement unit.

In general, the transducer 8 could comprise a microphone or a pressure sensor for detecting the parameters identifying the vibration, for example the amplitude, the frequency or the phase of the waveform.

Alternatively, the parameters identifying the vibration can be the frequency components of the vibration in a Fourier or Laplace domain or of the variable z, i.e. the variable of the so-called transform z.

The variable representative of the parameters could be a vector or matrix variable, for example comprising the parameters ordered in a pre-established manner.

Alternatively, the variable could be scalar; for example, the variable could coincide with a modulus, possibly squared, of the vector variable just indicated. In other words, more generally, the variable could represent the parameters in a condensed form. In this manner, the variable would anyway be dependent on the vibration and thus descriptive or representative thereof.

The vibration is an overall vibration, which can have more vibration contributions due to the operation of the motor 6.

Furthermore, the vibration constitutes an undesired fact since it comprises at least one frequency in the audible spectrum and thus corresponds to a sound, which constitutes in turn a disturbance for the driver of the motor vehicle 1.

Therefore, the variable representative of the vibration, namely of the identifying parameters thereof, can be considered as an error variable e. In other words, the vibration is intended as an error to be eliminated or at least to be reduced.

Therefore, a value of the error variable (be it a vector, a matrix, or a scalar variable) corresponding to a null vibration is desirable.

Clearly, when the parameters are accelerations of the point, the vibration is the more disturbing as the error variable e has a high modulus or norm. Therefore, reducing or minimizing the vibration corresponds in this case to reducing or minimizing the modulus of the error variable e.

Likewise, when the parameters are descriptive of a waveform, e.g. amplitude, frequency, phase, the vibration is the more disturbing as the amplitude is high. Therefore, reducing or minimizing the vibration corresponds in this case to reducing or minimizing the amplitude, which for example can define the error variable e, in this case scalar.

The control unit 9 is configured to acquire the error variable e detected by the transducer 8.

The transducer 8 generates a signal corresponding to the error variable e and is coupled to the control unit 9, such that the latter receives the signal and extracts a piece of information therefrom corresponding to the error variable e, thereby acquiring the error variable e.

On the basis of the error variable e, or more precisely of a value thereof, the control unit 9 is configured to determine one or more variable parameters of an adaptive model 101.

The adaptive model 101 is configured to compute a correction input 102 to be superposed or summed to the control input. For clarity, the term to sum is understood in an algebraic sense, i.e. considering that the sum among quantities of opposite sign coincides with a difference.

In this manner, i.e. by means of the superposition or sum, the correction input 102 corrects the control input and consequently the operation of the motor 6.

The objective of the correction is to decrease or cancel the noise, i.e. to bring the error variable e to a value corresponding to a null or at least reduced vibration with respect to the one caused by the operation of the motor 6 without the correction.

Therefore, the parameters of the adaptive model 101 are determined via an optimization algorithm for minimizing the vibration.

More specifically, the parameters of the adaptive model 101 are determined as minimizers of a cost function dependent on the error variable e and related to the vibration, such that a minimum of the cost function corresponds to a minimization of the first vibration.

For example, the cost function could be the expected value of the squared modulus of the error variable e. Therefore, the determined parameters of the adaptive model 101 consequently minimize the error variable e and the vibration.

In fact, the adaptive model 101 is a parametric function, in which variable parameters are the ones determined by the control unit 9, and which links at least one input, for example specified further on, to an output corresponding to or defined by the correction input 102. Therefore, the determined parameters are the ones which cause the adaptive model 101 to associate the optimal correction input 102 with the input, where the optimal correction input 102 is the one which consequently causes the minimization of the cost function, i.e. specifically of the error variable e, and of the vibration.

In the drawings, the adaptive model 101 is by way of example represented as a transfer function from the input to the output defined by the correction input 102. For example, the variable parameters can be the coefficients of the transfer function, in turn representable as a relation of polynomials in the Laplace variable or in the variable z.

In particular, the adaptive model 101 is an adaptive filter. Furthermore, the optimization algorithm is an algorithm known as a least mean squares algorithm, in which more in particular the cost function is the expected value of the squared modulus of the error variable.

The optimization algorithm is represented in general in FIGS. 3, 5, 6, 7 by the LMS block.

More specifically, the optimization algorithm determines the parameters of the adaptive model 101 as a function of the input, besides as a function of the error variable e.

The selection of the input for the adaptive model 101 entails the definition of variations, among which the ones represented in the drawings and described in the following.

Before describing the variations, a brief description of a particular case of the determination of the parameters of the adaptive model 101 will follow according to the least mean squares algorithm for the sake of completeness, although the algorithm is known per se.

The parameters of the adaptive model 101 at the current instant n are determined as the same parameters at the previous instant n−1 summed to a product of three factors, i.e. a tuning rate, the input or a function of the input at the previous instant n−1, and the error variable e at the previous instant n−1. Clearly, at the initial instant, the parameters start from an initial hypothesis value. For example, the function of the input can be a quantity obtained by applying a function 103 to the input; the function 103 is in particular a retarding filter, represented in the drawings as a transfer function.

What described above is a classic version of the least mean squares algorithm, but also a normalized version can be applied.

Figure 3:
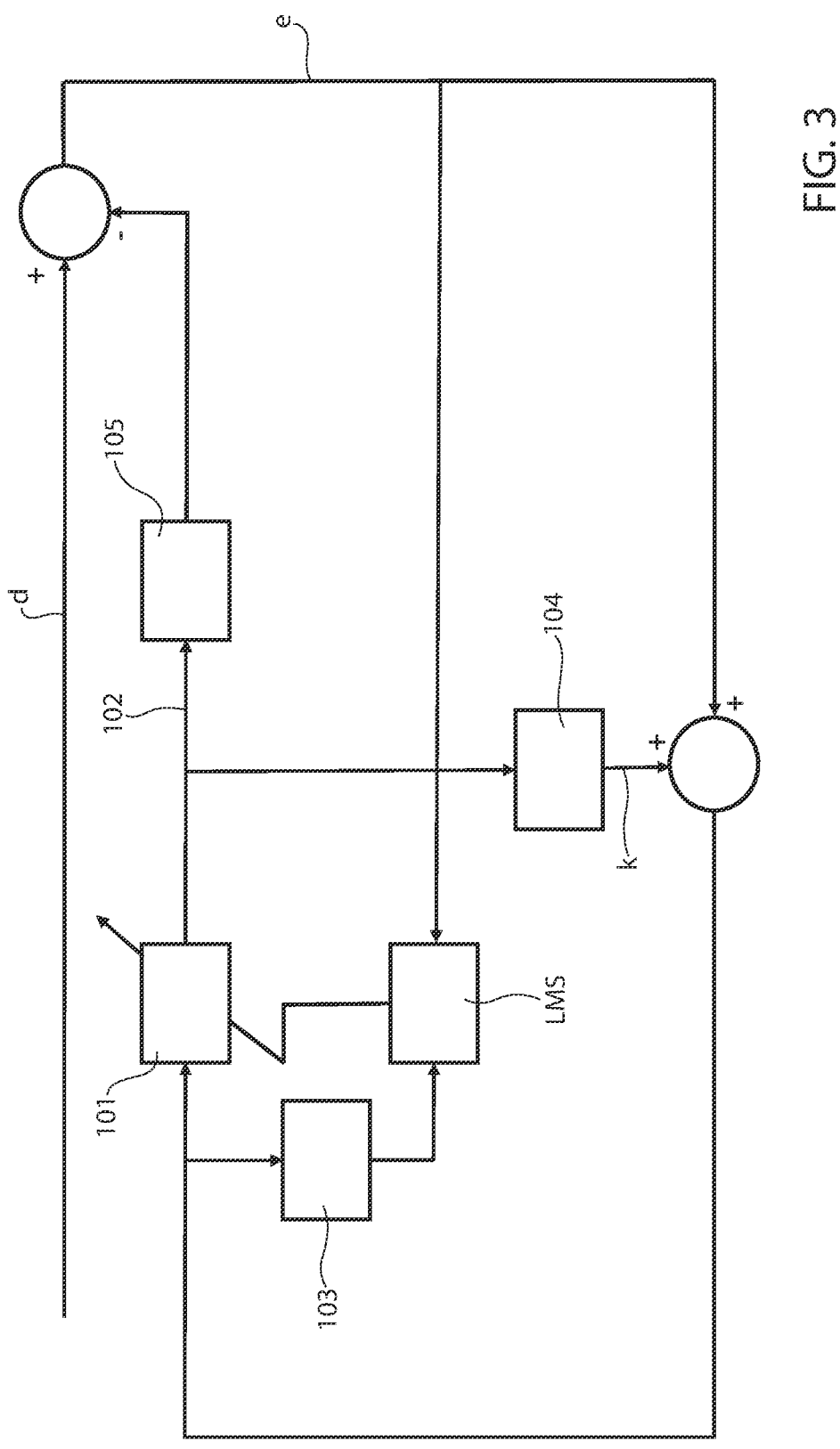
FIG. 3 is a block diagram which represents operations of a method according to an embodiment of the invention.
Figure 5:
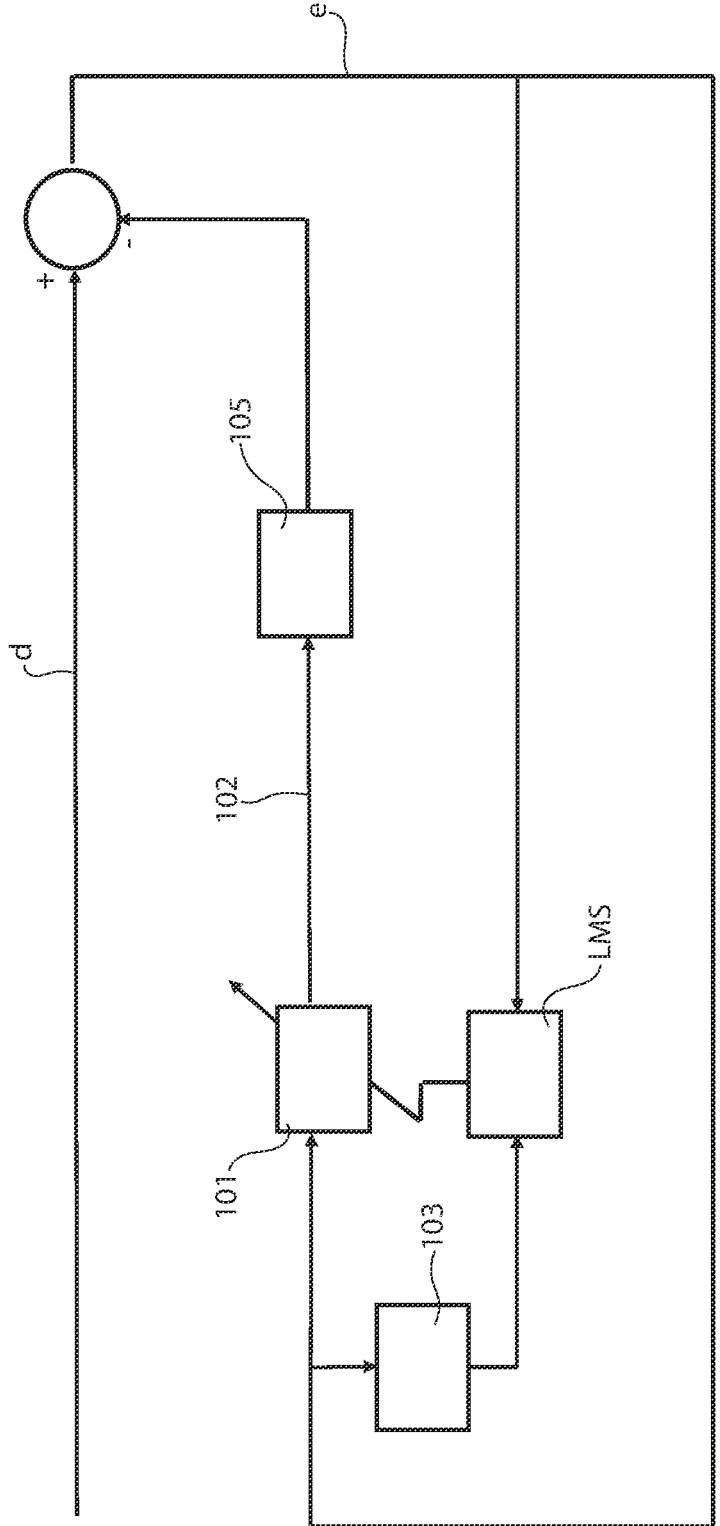

According to the variations of FIGS. 3, 5, the input is a predetermined function of the error variable e, i.e. it depends on it.

More in particular, according to the variation of FIG. 3, the control unit 9 comprises or stores an estimator function 104 for associating or which associates the correction input 102 with an estimated variable k identifying a portion of the overall vibration, which is therefore given by the superposition or sum of the latter portion and of an unknown portion considerable as a disturbance portion d or as a residual error to be eliminated.

The estimator function 104 estimates an actual function 105 which associates the correction input 102 with the effect that the latter has, by means of the operation of the motor 6, on the overall vibration. In fact, per se, the correction input 102, if utilized as control input, i.e. if the control input coincides with the correction input 102, would have an effect on the motor 6 or more precisely on the operation thereof, which in turn would produce the vibration. Therefore, the correction input 102 superposed to the control input mitigates the overall vibration as if the correction input 102 provides an independent contribution of vibration on the disturbance portion d with the aim of counteracting the disturbance portion d, thereby nullifying or at least attenuating the overall vibration resulting from the superposition or sum of the independent contribution and of the disturbance portion d.

Still with reference to the variation of FIG. 3, the input of the adaptive model 101 comprises or more precisely is defined by a sum between the error variable e and the variable k, i.e. the variable computed by applying the estimator function 104 to the correction input 102.

Such sum, i.e. specifically the input of the adaptive model 101, is actually an estimated variable d' representative of the disturbance portion d.

Therefore, in the variation of FIG. 3, the adaptive model 101 associates the estimated variable d' with the correction input 102.

The estimator function 104 could be identified and stored in the control unit 9 in many manners, including manners known per se.

For example, the estimator function 104 could be identified by the control unit 9 by means of a model identification method from experimental data. In this case, the experimental data would comprise detections or selected values of the control input as inputs of the estimator function 104 and corresponding detections of the effect of the control input. Here, in this step of calibrating, i.e. of collecting the experimental data, the control input coincides with the correction input 102.

Figure 4:
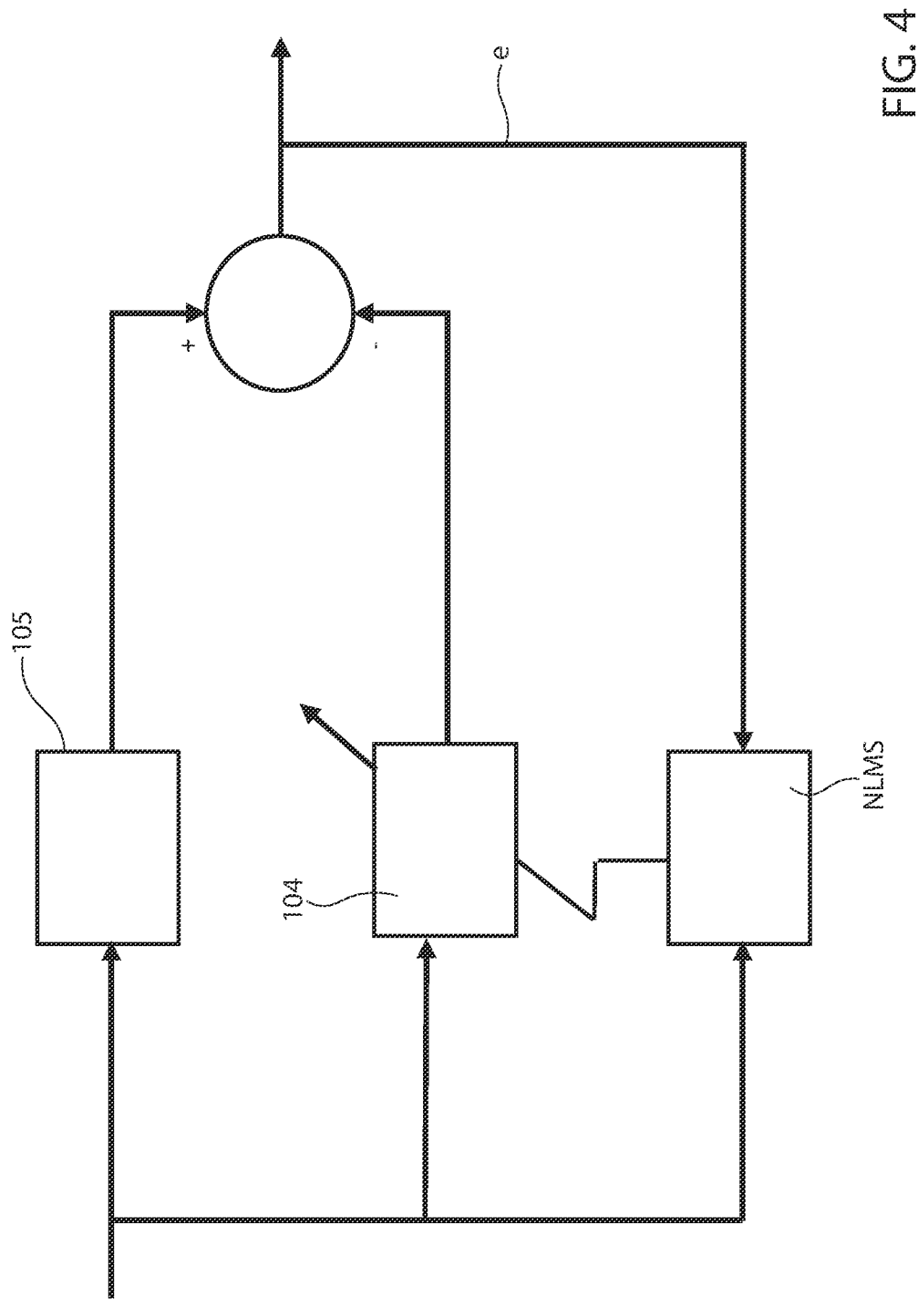
FIG. 4 is a block diagram which represents further operations of the method of FIG. 3, and FIGS. 5, 6, 7 are block diagrams which represent operations of respective methods according to further embodiments of the invention.

Preferably, as is illustrated in FIG. 4, the estimator function 104 is determined by the control unit 9 as an adaptive model, in particular via the least mean squares optimization algorithm, more in particular normalized.

In other words, the estimator function 104 is a parametric adaptive model, i.e. comprises one or more variable parameters which must be determined so as to define the estimator function 104; the optimization algorithm determines the latter parameters.

In FIG. 4, the estimator function 104, i.e. the adaptive model, and the actual function 105 receive the input and provide the estimated output and the actual output, respectively. The difference between the estimated output and the actual output constitutes the error of the adaptive model, which serves together with the input for determining the variable parameters of the estimator function 104, i.e. the variable parameters of the adaptive model, in a manner similar to what already described for the adaptive model 101. Here, the NMLS block represents the least mean squares optimization algorithm, specifically normalized.

The input for determining the estimator function 104 with the least mean squares optimization algorithm is preferably a white noise, or a linear combination of simple waveforms. The input can actually be generated by the control unit 9 by means of an inverter of the control unit 9, for example. Here, from a physical point of view, the input is the control signal, specifically coinciding with the correction signal 102.

In the variation of FIG. 5, the input is the error variable e. The variation of FIG. 5 differs from the variation of FIG. 3 substantially only for the input. Clearly, in the variation of FIG. 5, the estimator function 104 is not necessary, since the input is directly the error variable e.

Figure 6:
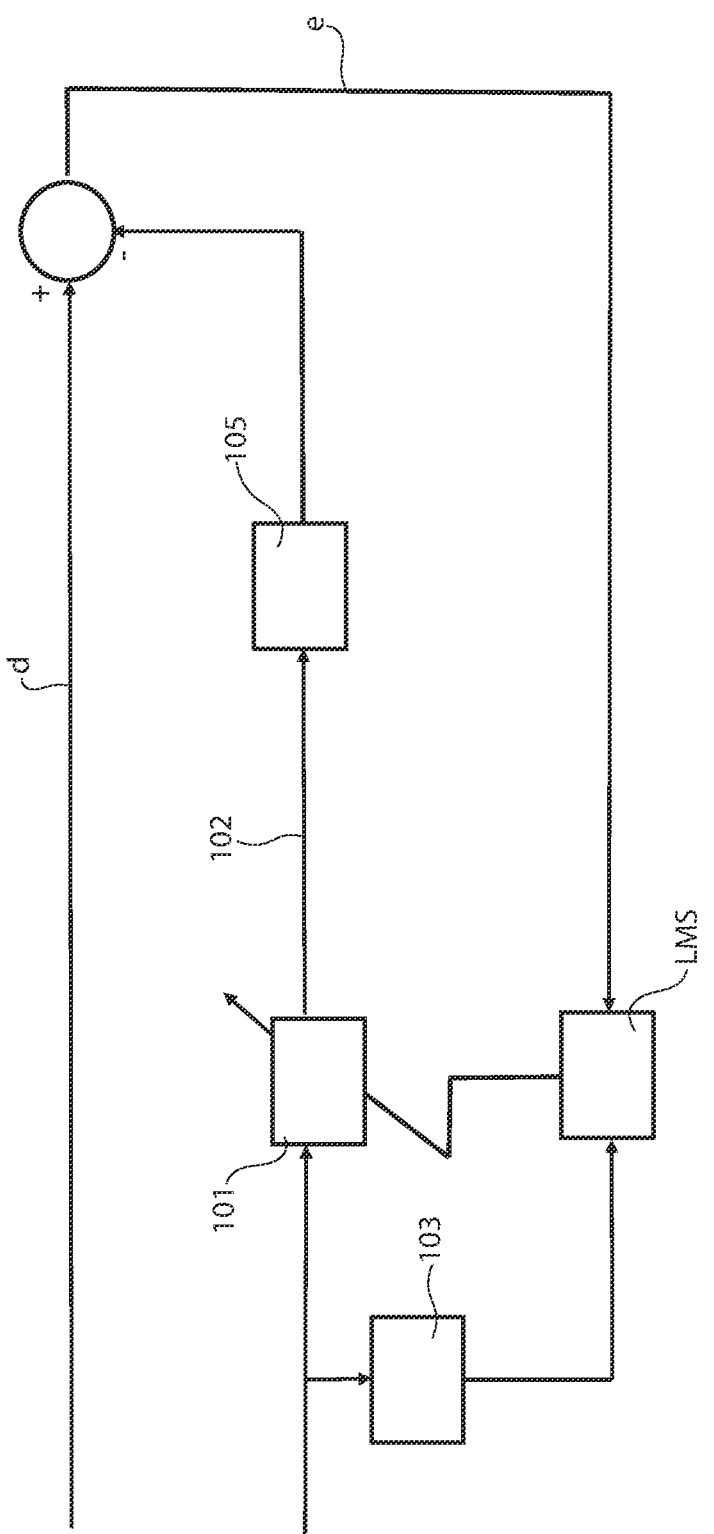

In the variation of FIG. 6, the input is a known variable representative of an estimated vibration having one or more frequencies computed as a predetermined function of the output speed of the motor 6. The more frequencies can constitute a part of the frequency spectrum of the estimated vibration or even the entire spectrum.

The predetermined function represents an estimated link or a link known a priori between the output speed from the motor 6 and the frequency or the frequencies of the disturbance portion d. In other words, the estimated vibration has frequencies estimated as frequencies of the disturbance portion d.

As already mentioned or anyway inferable from above, the disturbance portion d is part of the overall vibration represented by the error variable e.

Furthermore, the disturbance portion d is given by the superposition or sum (still in algebraic sense) between the overall vibration and the effect of the correction input 102 or of the operation of the motor 6 when controlled with the correction input 102, here specifically coinciding with the control input.

In fact, specularly, the overall vibration is given by the superposition or sum of the disturbance portion d with the effect of the correction input 102.

The variation of FIG. 6 differs from the variation of FIG. 5 only for the input of the adaptive model 101. Also here, the estimator function 104 is not necessary.

The variations of FIGS. 5, 6, represent a simplification of the variation of FIG. 3, since the estimator function 104 is not necessary here.

Figure 7:
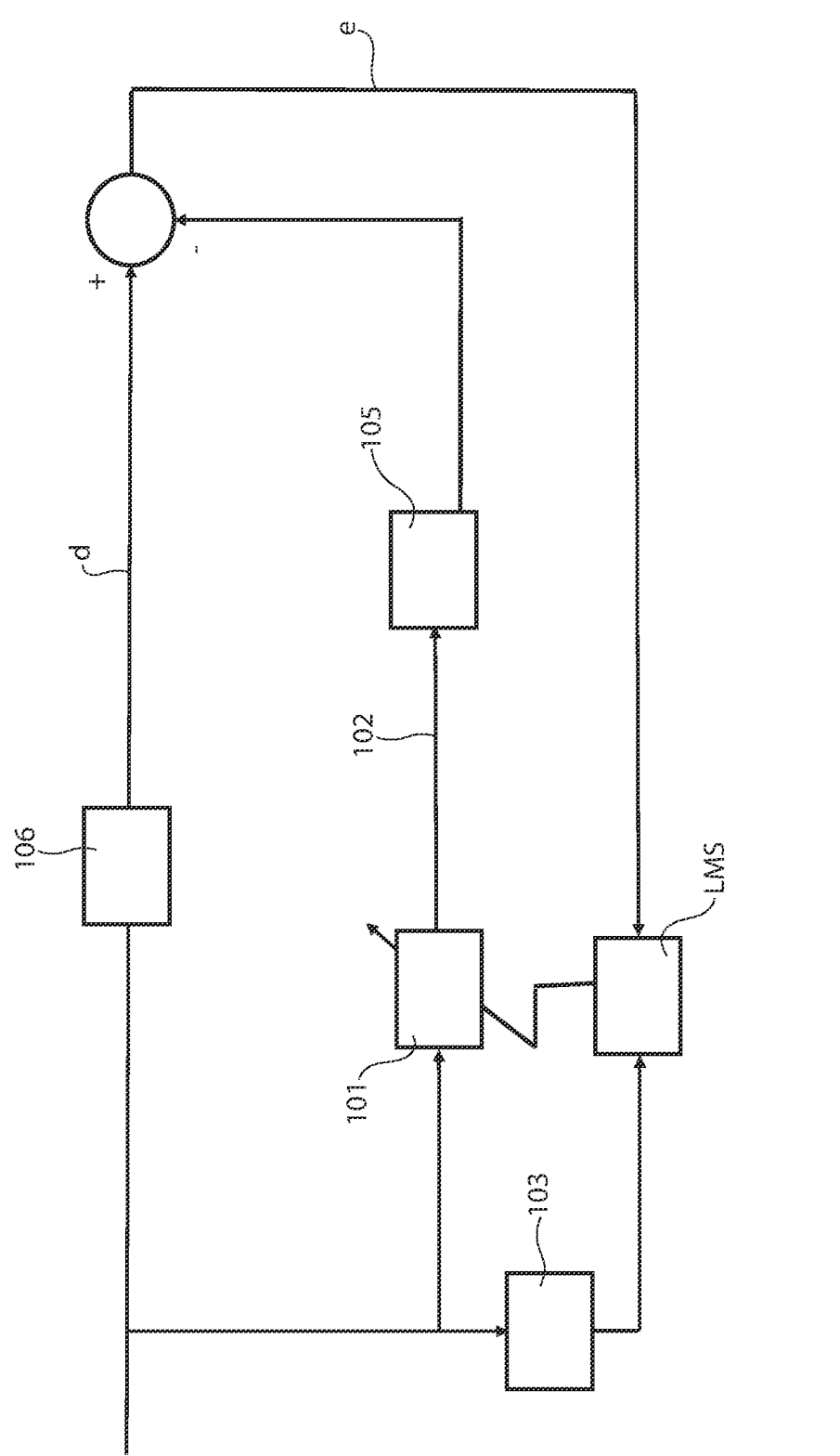

In the variation of FIG. 7, the input of the adaptive model 101 is a reference variable representative of one or more parameters identifying a vibration at the motor 6 or anyway at a different point 11 with respect to the point 10. The point 11, possibly being part of the motor 6 or more in general of the axle assembly 5, is considered as a source point of the overall vibration at the point 10.

In FIG. 7, the disturbance portion d is associated with the reference variable by means of a function 106, in particular a transfer function.

Therefore, the vibrations respectively represented by the reference variable and by the error variable e (i.e. the one detectable by means of the transducer 8) are linked to each other in a biunique manner.

In other words, the disturbance portion d is the effect of the vibration identified by the reference variable.

The axle assembly 5 here comprises a further transducer 20 configured to detect the reference variable.

The control unit 9 is configured to acquire the reference variable and to use it as the input of the adaptive model 101.

More specifically, the transducer 20 is coupled to the control unit 9.

The transducer 20 is configured to generate a signal corresponding to the detected reference variable, such that the control unit 9 receives the signal. The control unit 9 is then configured to extract from the signal a piece of information corresponding to the reference variable, thereby acquiring the latter.

In the variation of FIG. 7, the optimization algorithm results to be more stable than the other variations.

Preferably, in general, the function 103 coincides with the function 104. In fact, the applicant has experimentally observed that the function 104 has a retarding effect on the input with benefits on the stability of the optimization algorithm.

Alternatively, the function 103 could be a transfer function defined by z or Laplace variable raised to an exponent equal to the negative of the ratio of a sampling frequency of the control unit 9 to four times the frequency of the input.

Summarizing, the control unit 9 is configured to determine the correction input 102 using the adaptive model 101 defined with the determined variable parameters.

Furthermore, the control unit 9 is configured to control the motor 6 with the updated control input by superposing the correction input 102 to the control input.

In general, the control unit 9 performs a noise reduction method for reducing a noise caused by an operation of the motor 6.

The method comprises the steps of: acquiring from the transducer 8 the error variable e representative of one or more parameters identifying the overall vibration caused by the operation of the motor 6 controlled by the control input; determining one or more variable parameters of the adaptive model 101 configured to compute the correction input 102 to be superposed to the control input to update the control input, thereby correcting the operation of the motor 6; determining the correction input 102 by the adaptive model 101 defined with the determined variable parameters; controlling the motor 6 with the updated control input by superposing the correction input 102 to the control input; and wherein the parameters of the adaptive model 101 are determined via an optimization algorithm as minimizers of a cost function dependent on the error variable e and related to the overall vibration, such that a minimum of the cost function corresponds to a minimization of the overall vibration.

Based on the foregoing, the advantages of the axle assembly 5 and of the method according to the invention are evident.

Thanks to the minimization of the cost function, the overall vibration of a point where a disturbing noise is manifested is strongly attenuated or even nullified by correcting the operation of the motor 6 by means of the simple correction signal 102, which is perfectly superposable to the control signal for the updating thereof.

Finally, it is clear that modifications and variations can be made to the axle assembly 5 and to the method according to the invention which anyway do not depart from the scope of protection defined by the claims.

In particular, each one of the details included in the figures is independent of the other details and is specifically intended for solving specific technical problems in isolation with respect to the other details.

Furthermore, although the figures show cases with one single input for the adaptive model 101 and one single canceling point of the overall vibration, the extension of the teachings of the description to cases with a plurality of inputs for the adaptive model 101 and/or a plurality of canceling points of the overall vibration is of immediate understanding for a person skilled in the art. Such extension is further covered by the claims.

What is claimed is:

1. An electric axle assembly for a motor vehicle, the axle assembly comprising an electric machine suitable for operating as a motor, an axle for transmitting a power delivered by the electric machine to wheels of the motor vehicle, a transducer configured to detect an error variable representative of one or more parameters identifying a first vibration caused by an operation as a motor of the electric machine controlled by a control input, and a control unit configured to:

acquire the error variable detected by the transducer, determine one or more variable parameters of an adaptive model configured to compute a correction input to be superposed to the control input to update the control input, thereby correcting the operation of the electric machine as a motor, the parameters of the adaptive model being determined by an optimization algorithm as minimizers of a cost function dependent on the error variable and related to the first vibration, such that a minimum of the cost function corresponds to a minimization of the first vibration, determine the correction input using the adaptive model defined with the determined variable parameters, and control the electric machine with the updated control input by superposing the correction input to the control input.

2. The axle assembly according to claim 1, wherein the adaptive model and the optimization algorithm are an adaptive filter and a least mean squares algorithm, respectively, in particular wherein the cost function is the expected value of the squared modulus of the error variable.

3. The axle assembly according to claim 2, wherein the adaptive model links at least one input to an output, wherein the output is the correction input, and wherein the input is a given variable representative of a further vibration with a frequency computed as a predetermined function of an output speed of the electric machine, wherein the predetermined function represents an estimated or a priori known link between the output speed of the electric machine and the frequency of a second vibration given by a superposition of the first vibration and a third vibration corresponding to an effect of the operation as a motor of the electric machine when controlled with the correction input.

4. The axle assembly according to claim 3, further comprising a further transducer configured to detect a reference variable representative of one or more parameters identifying a further vibration caused by the operation of the electric machine at a point of the electric machine, wherein the control unit is configured to acquire the reference variable, and wherein the adaptive model links at least one input to an output, wherein the output is the correction input, and wherein the input is the reference variable.

5. The axle assembly according to claim 4, wherein the adaptive model links at least one input to an output, wherein the output is the correction input, and wherein the input is a predetermined function of the acquired error variable.

6. The axial assembly according to claim 5, wherein the input is the acquired error variable.

7. The axle assembly according to claim 6, wherein the control unit comprises an estimator function for associating the correction input with an estimated variable identifying a second vibration being part of the first vibration, such that the first vibration is given by a superposition of the second vibration and an unknown disturbance vibration, wherein the input comprises a sum between the error variable and a further variable computed by applying the estimator function to the correction input.

8. The axle assembly according to claim 7, wherein the input is defined by said sum.

9. A noise reduction method for reducing a noise caused by an operation as a motor of an electric machine of an axle assembly with an axle to transmit a power delivered by the electric machine to wheels of a motor vehicle, the method comprising:

acquiring from a transducer an error variable representative of one or more parameters identifying a first vibration caused by the operation as a motor of the electric machine controlled by a control input, determining one or more variable parameters of an adaptive model configured to compute a correction input to be superposed to the control input to update the control input, thereby correcting the operation as a motor of the electric machine, determining the correction input by the adaptive model defined with the determined variable parameters, controlling the electric machine with the updated control input by superposing the correction input to the control input, wherein the parameters of the adaptive model are determined via an optimization algorithm as minimizers of a cost function dependent on the error variable and related to the first vibration, such that a minimum of the cost function corresponds to a minimization of the first vibration.

\* \* \* \* \*